(12) United States Patent
Dixon et al.

(10) Patent No.: US 6,496,911 B1
(45) Date of Patent: Dec. 17, 2002

(54) APPARATUS FOR MEMORY BUS TUNING AND METHODS THEREFOR

(75) Inventors: Robert Christopher Dixon, Austin, TX (US); Thoi Nguyen, Austin, TX (US); Tuan Hoang Nguyen, Burien, WA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/165,954

(22) Filed: Oct. 2, 1998

(51) Int. Cl.[7] ............................................... G06F 12/00
(52) U.S. Cl. ........................................ 711/170; 709/105
(58) Field of Search ................................ 711/170–172; 709/105

(56) References Cited

U.S. PATENT DOCUMENTS

| | | | |
|---|---|---|---|
| 5,625,580 A | * | 4/1997 | Read et al. .................. 364/578 |
| 5,727,182 A | * | 3/1998 | Fukushima et al. .......... 395/442 |
| 5,752,066 A | * | 5/1998 | Bealkowski et al. ... 395/800.01 |
| 5,768,584 A | * | 6/1998 | MacDonald et al. ......... 395/651 |
| 6,067,650 A | * | 5/2000 | Beausang et al. ............. 714/726 |

* cited by examiner

*Primary Examiner*—Matthew Kim
*Assistant Examiner*—Pierre M. Vital
(74) *Attorney, Agent, or Firm*—Barry S. Newberger; Winstead Sechrest & Minick P.C.; Leslie A. Van Leeuwen

(57) ABSTRACT

An apparatus and method for memory bus tuning are implemented. A plurality of drivers having a plurality of selectable drive levels are coupled to a memory bus. The memory bus is connected to a memory device which may have a variable amount of memory, which may be in the form of dual-in-line memory modules (DIMM). A drive level is selected in response to a determination of the amount of memory included in the memory device. A register operable for receiving a data value corresponding to the amount of memory is coupled to the drivers, the drive level being selected thereby.

18 Claims, 4 Drawing Sheets

APPARATUS FOR MEMORY BUS TUNING AND METHODS THEREFOR

TECHNICAL FIELD

The present invention relates in general to data processing systems, and in particular, to memory bus tuning in data processing systems having variable numbers of dynamic memory modules.

BACKGROUND INFORMATION

High-speed data processing systems employing buffered synchronous dynamic random access memory (SDRAM) have a tightly constrained timing budget. Buffered SDRAM include an on-chip buffer to redrive the control signals. This SDRAM may be operated either in buffer mode or in register mode. In register mode, control signals, such as row address strobe (RAS), column address strobe (CAS), and read/write (R/W) control are latched for one clock cycle. In this way, register mode SDRAM avoid control signal set-up time constraints, but pay a one clock cycle penalty. Conversely, SDRAM operating in buffer mode avoid the one-cycle penalty but must satisfy control signal set-up time requirements.

As memory cycle times decrease, that is, as memory speed increases, set-up time requirements become increasingly stringent. For example, in a data processing system having a memory bus operating at approximately 83 megahertz (MHz), the memory cycle time is 12 nanoseconds (ns). With a typical SDRAM dual inline memory module (DIMM) requiring a 7 ns control signal set-up time, and a 2 ns data bus hold time, only a 3 ns design margin remains.

In a data processing system having variable numbers of DIMMs, the changing load condition presented thereby may substantially exhaust the design margin. This may be understood by referring to FIG. 1, illustrating an SDRAM timing diagram. In SDRAM, memory activity is synchronized to clock signal 102. The memory cycle time is determined by the clock period, $T_p$, which in the example discussed above is approximately 12 ns, corresponding to a clock frequency of approximately 83 MHz. Memory control signals 104 must be switched, that is, asserted, a specified minimum set-up time, $T_{su}$, before the clock edge, $T_1$, initiating the current memory cycle. If the control signals are asserted less than a set-up time prior to the clock edge, operation of the SDRAM may be unreliable.

Increased loading on the SDRAM control signal lines due to added SDRAM DIMMs increase the switching times of the control signals. This is illustrated by the dotted portion of control signals 104 illustrated in FIG. 1. If the switching time of the control signals becomes too long, the set-up time criteria for the SDRAM will be violated, and the operation of the SDRAM will be compromised.

Additionally, proper operation of the SDRAM requires that data signals be held for a period of time, $T_h$, after the clock edge, $T_2$, latching the data. In a data processing system in which the number of SDRAM DIMMs is variable, increasing the number of DIMMs makes the hold time criteria easier to satisfy. Conversely, reducing the number of DIMMs reduces the hold time margin. If the hold time criteria is violated, capture of the data may fail.

Thus, there is a need in the art for apparatus and methods for tuning, or matching, the memory bus to varying load conditions, thereby maintaining control signal switching times within set-up time constraints while maintaining control signal wave shapes, and, additionally, preserving data signal hold times.

SUMMARY OF THE INVENTION

The aforementioned needs are addressed by the present invention. Accordingly, there is provided, in a first form, an apparatus for memory bus tuning, which includes a plurality of drivers coupled to the memory bus, wherein each driver has a selectable drive strength. At least one register operable for receiving a data value is also included, the selectable drive strength being selected in response to the data value, wherein the data is operable for setting in response to an amount of memory coupled to the memory bus.

There is also provided, in a second form, a data processing system including a central processing unit (CPU), a memory device coupled to the CPU via a memory bus, and an apparatus for tuning the memory bus. The apparatus for tuning the memory bus includes a plurality of drivers coupled to the memory bus, wherein each driver has a selectable drive strength, and at least one register operable for receiving a data value from the CPU, the selectable drive strength being selected in response to the data value, the data being operable for setting in response to an amount of memory coupled to the memory bus.

Additionally there is provided, in a third form, a method of memory bus tuning. The method includes the steps of determining an amount of memory in a memory device coupled to the memory bus, setting a first data value in a first register in response to the amount of memory, and selecting a drive strength of a plurality of drivers operable for driving the memory bus in response to the first data value.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
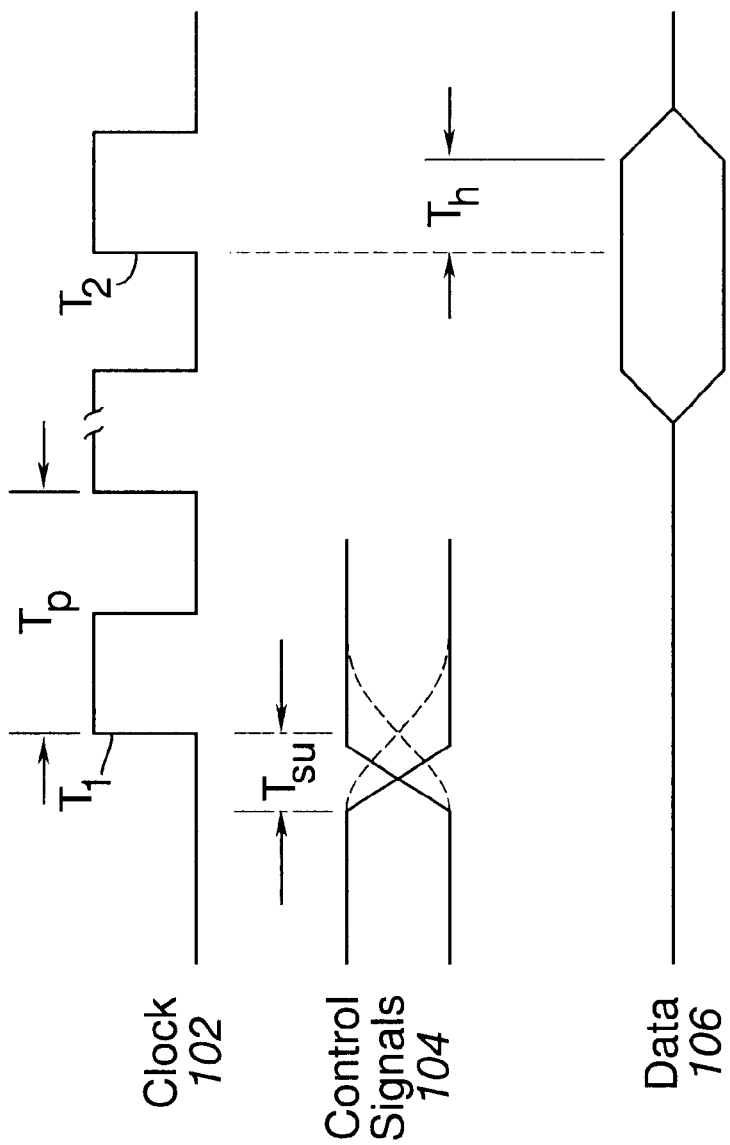
FIG. 1 illustrates a synchronous dynamic random access memory (SDRAM) timing diagram.

The present invention provides apparatus and methods for memory bus tuning in a data processing system having variable amounts of SDRAM memory. Drivers are provided with selectable drive strengths. The drive strength is selected by the data processing system in accordance with the amount of memory included in a particular data processing system configuration. Also provided are dummy load balancers inserted on a memory bus to compensate for reduced amounts of memory. The dummy load balancers serve to reduce the range of loads presented on the memory bus data lines with varying amounts of memory. There are also provided predetermined series resistors within the memory bus to provide additional control of the memory bus tuning.

In the following description, numerous specific details are set forth such as specific numbers of SDRAM DIMMs, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail.

Refer now to the drawings wherein depicted elements are not necessarily shown to scale and wherein like or similar elements are designated by the same reference numeral through the several views.

Figure 2A:
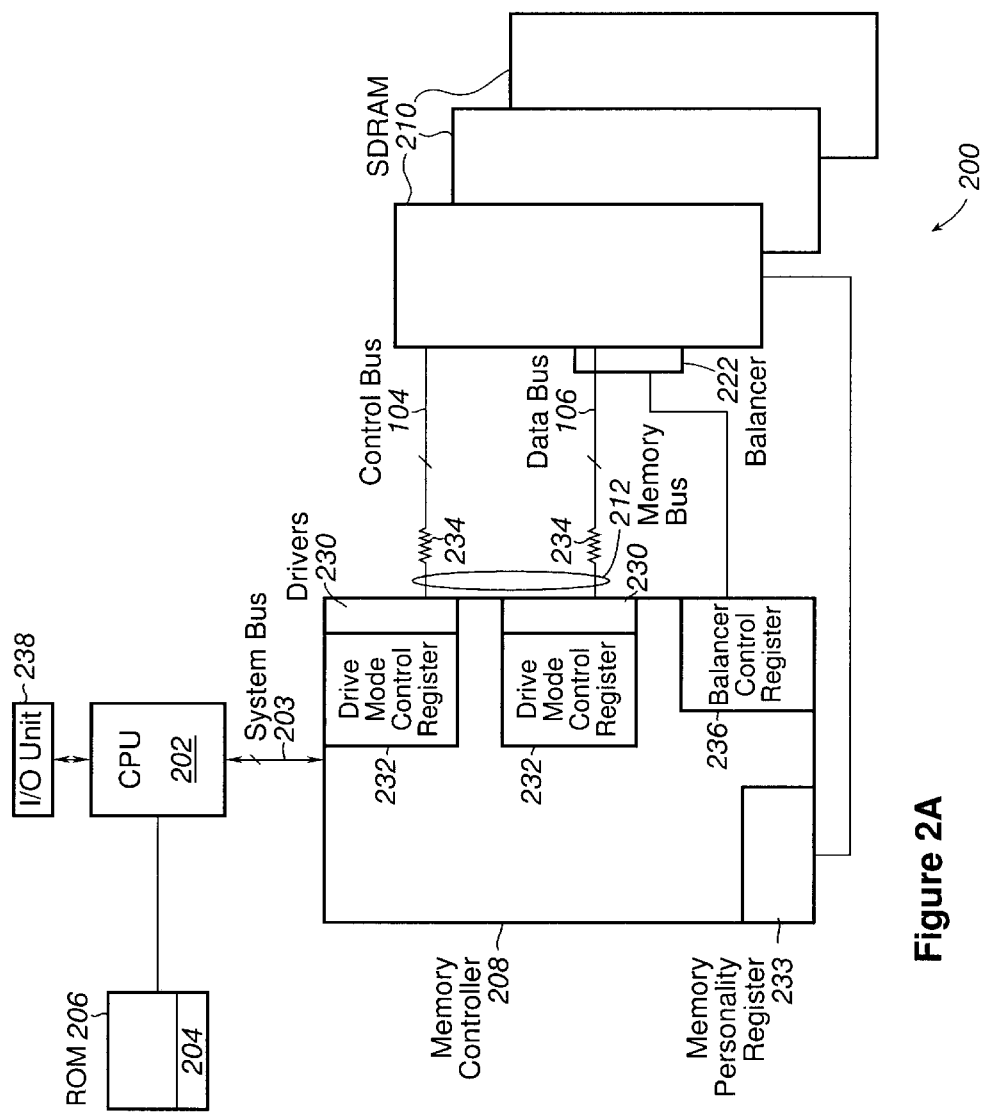
FIG. 2A illustrates, in block diagram form, a data processing system in accordance with an embodiment of the present invention.

Referring now to FIG. 2A, there is illustrated data processing system 200 in accordance with the principles of the present invention. Data processing system 200 includes central processing unit (CPU) 202 which may be controlled by firmware 204 embodied in read only memory (ROM) 206. CPU 202 is coupled to memory controller 208 which interfaces CPU 202 with a plurality of SDRAM 210. Memory controller 208 is coupled to SDRAM 210 via memory bus 212 which includes a plurality of control signals 104 and a plurality of data signals 106.

The plurality of SDRAM 210 may include a preselected amount of memory in accordance with a particular configuration of data processing system 200. The plurality of SDRAM may, in an embodiment of the present invention, be in the form of a plurality, N, of DIMMs. Each DIMM may include a plurality of memory cells. For example, in such an embodiment of the present invention, SDRAM 210 might include four DIMM, and each DIMM may constitute single bank (representing a single load) or, alternatively, double bank (two load) DIMM. In such an embodiment, SDRAM 210 may be configured with memory representing from one to eight loads.

A selectable load balancer 222 may be coupled to data bus 106. The operation of load balancers 222 will be discussed further in conjunction with FIG. 3 below.

Control signals 104 and data signals 106 are driven onto memory bus 212 by a plurality of drivers 230 within memory controller 208. Drivers 230 have a selectable drive strength which may be selected from a predetermined plurality of drive levels. In an embodiment of the present invention, drive level selection may correspond to selection of an output impedance of each driver. A drive level is selected from among the plurality in accordance with the value written into drive mode control register 232. The value is written, at boot-up, into drive mode control register 232 by CPU 202 under the control of firmware 204. At boot up, memory controller 208 queries SDRAM 210 to determine the amount of memory available in data processing system 200 whereby circuitry within SDRAM 210 inform controller 208 as to the amount of memory in SDRAM 210. This information is retained in memory personality register 233. CPU 202 uses the information, through firmware 204, and in response thereto, CPU 202 sets the data value in drive mode control register 232.

If SDRAM 210 includes a smaller amount of memory, a low drive level on control bus 104 is selected via the data value in drive mode control register 232. As the amount of memory in SDRAM 210 is increased, successively increased levels of drive are selected by firmware 204 in order to provide sufficient drive to the increasing load represented by the additional memory.

Figure 2B:
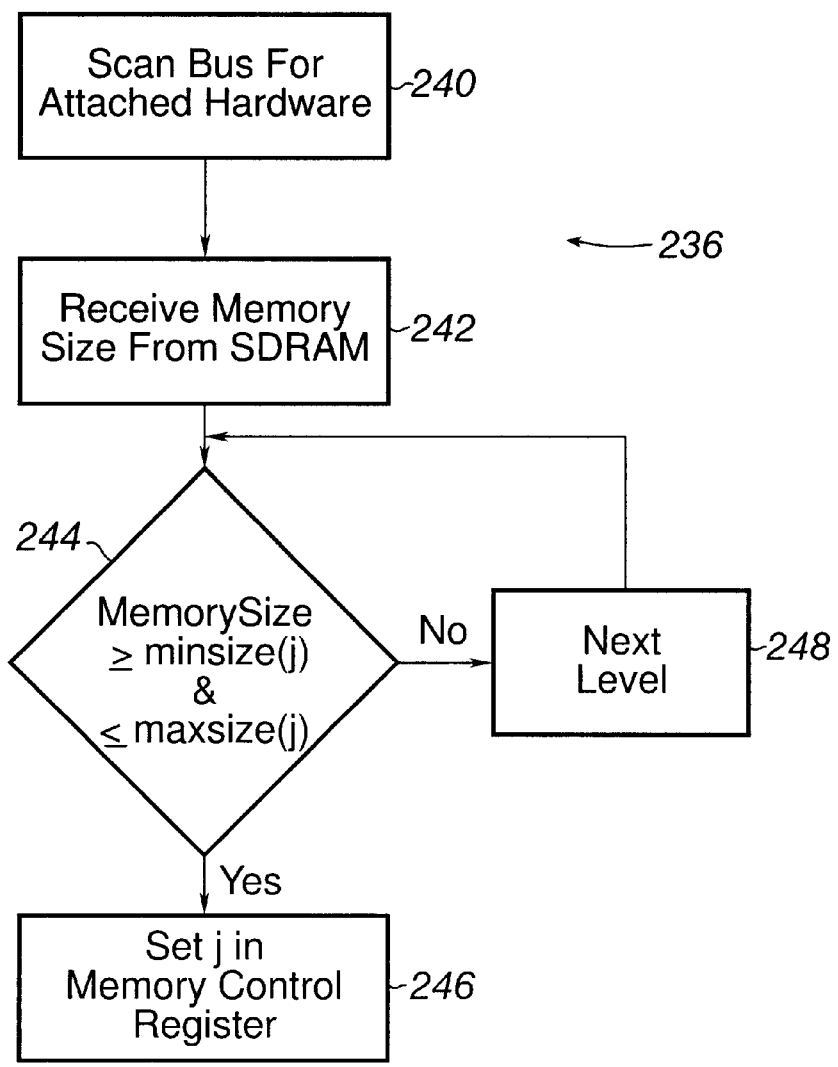
FIG. 2B illustrates, in flowchart form, a method of selecting a drive strength according to an embodiment of the present invention.

This may be further understood by referring now to FIG. 2B illustrating one method 236 for selecting a drive strength in accordance with an embodiment of the present invention. In step 240 scans system bus 203 for attached hardware. In response, SDRAM 210 responds with the amount of memory included therein, which is received by personality register 233 and thence by firmware 204, in step 242. In step 244, firmware 204 determines if the memory size received in step 242 lies between a minimum size (minsize(j)) and maximum size (maxsize(j)) corresponding to the "jth" drive level of the plurality of selectable drive levels. If so, firmware 204 sets the value "j" in mode control register 232, in step 246. Otherwise, firmware 204 proceeds to the next level, in step 248, and repeats the determination in step 244. Method 236 loops between steps 244 and 248 until the appropriate drive level is found.

The drive level set in step 246 may then be used by mode controller 208 to select the drive level of drivers 230. This may be done, for example, by including drivers having strengths corresponding to each selectable level in the plurality of drivers 230. Drivers having a predetermined strength are known in the art. The appropriate drivers may the be switched onto bus 240 by switches controlled by the level value in control register 232. For example, in such an embodiment having a four selectable drive levels, control register may contain two bits of data which are decoded by a two of-four decoder coupled to switches connecting the corresponding drivers to bus 212.

Alternatively, an embodiment of the present invention may be implemented without interfacing SDRAM 210 via memory controller 208. In such an embodiment, CPU 202 performs the tasks associated above with memory controller 208. For example, drive mode control registers 232 may be embodied in general purpose registers (GPR) within CPU 202, or alternatively, in other preselected storage units. An embodiment of the present invention of this form would incorporate strength selectable drivers 230 between system bus 203 and memory bus 212.

These embodiments are illustrative only. It would be understood by one of ordinary skill in the art that other numbers of levels may be employed in alternative embodiments of the present invention. An artisan of ordinary skill would further understand that other methods and circuitry operable for selecting drive levels would fall within the spirit and scope of the present invention.

In an embodiment of the present invention in which SDRAM 210 includes a plurality of DIMMs, the increased memory may be provided by additional DIMMs and additional numbers of memory cells included in the DIMM. By increasing the drive level with increasing memory, the failure of the set-up time criteria illustrated by the dotted portion of the curve representing control signals 104 in FIG. 1 may be avoided.

Figure 3:
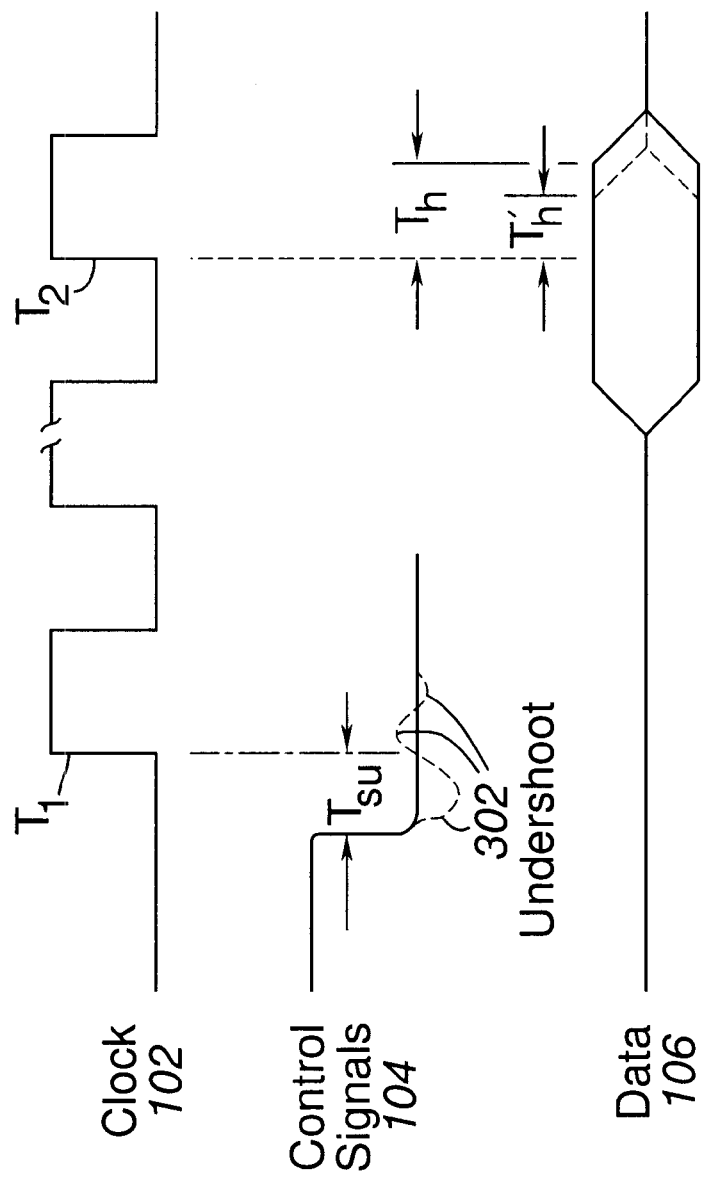
FIG. 3 illustrates another SDRAM timing diagram.

Moreover, ringing of the memory bus signals may be avoided as well. For light loads, represented by a small number of modules in SDRAM 210, a fixed strength driver may overdrive the memory bus. This may be understood by referring to FIG. 3 illustrating a timing diagram as in FIG. 1. At least a set-up time prior to transition $T_1$ of clock 102, control signals 104 switches. As in FIG. 1, the solid portion of the control signals 104 curve of FIG. 3 represents a tuned control signal waveform. If, however, memory bus 212 is lightly loaded because, for example, SDRAM 210 includes a small amount of memory, a high driver strength may overdrive control signals 104 leading to ringing, wherein control signal 104 includes an undershoot portion 302. As a consequence of the ringing, SDRAM 210 may be damaged. By matching the driver strength to the load, in accordance to the principles of the present invention, wherein a preselected level of drive is selected according to the amount of memory in SDRAM 210, as previously described, the ringing may be avoided. Ringing as manifest by undershoot 302 may be further damped by inclusion of series resistors 234. As previously described, in an embodiment of the present invention, variable amounts of memory may correspond to variable numbers of DIMM included in SDRAM 210.

With respect to data signals 106, selectable drive strength drivers may be used to drive data signals 106. For the data signals, reducing an amount of memory reduces the load on the data lines. For a fixed drive strength, reducing the load may reduce the hold-up time, as illustrated by the dotted portion of the data 106 waveform in FIG. 3, wherein the hold-up time is reduced from $T_h$ to $T'_h$. The hold-up time may be maintained within required specifications by reducing the drive strength, concomitantly.

However, drive strength control alone may not be sufficient to tune the data lines 106. SDRAM 210 produced by different vendors may present different loads on data lines although the amount of memory is otherwise the same. Thus, although an amount of memory may be fixed in a particular configuration of data processing system 200, the memory may represent different loads on data lines 106, depending on the SDRAM vendor. In order to ensure a predetermined minimum load on data lines 106, load balancers 222 may be coupled to data lines 106. Load balancers 222 constitute capacitive loads. These increase the capacitive load presented to data signals 106. The increased load stretches the hold-up time of the data signal whereby the data signal hold-up time, $T_h$, is maintained within the specifications of SDRAM 210.

Load balancers 222 may be switched onto data lines 106 in accordance with a data value in balancer control register 236. The data value is set in balancer control register by firmware 204 in accordance with an amount of memory in SDRAM 210, in the same way as a data value is set in drive mode control register 232, and described in conjunction with FIG. 2B. It would be understood by an artisan of ordinary skill, however, that for a given level of drive, for increasing values of j in step 246, decreasing numbers of load balancers are switched into data lines 106. In other words, the number of load balancers switched may be in proportion to the difference between maximum number of balancers, $j_{max}$, and j.

Alternative embodiments of load balancers 222 may be implemented within the spirit and scope of the present invention. In an alternative embodiment of data processing system 200, in which SDRAM 210 constitutes a predetermined number of memory slots having a preselected portion of slots filled by memory modules, load balancers 222 may be implemented by inserting load modules into slots unoccupied by memory. In another alternative embodiment, the data value in balancer control register 236 may be set by CPU 202 in response to input via input/output (I/O) unit 238 which may include such known devices as a keyboard, and mouse.

The present invention provides for the tuning of memory bus 212 to satisfy hold time and set-up time requirements presented by the high bus frequencies used in high-speed data processing systems. Dynamically selecting bus driver strengths in accordance with a variable number of memory modules may satisfy the set of requirements represented by high memory bus frequencies without generating ringing on the memory bus lines. Load balancing of the data lines may ensure that hold-up times are maintained when the number of memory modules included in the data processing system are changed in accordance with a particular configuration of the data processing system.

Although the present invention and its advantages have been described in detail, it should be understood that various changes, substitutions and alterations can be made herein without departing from the spirit and scope of the invention as defined by the appended claims.

What is claimed is:

1. An apparatus for memory bus tuning comprising:
   a plurality of drivers coupled to said memory bus, wherein each driver has a selectable drive strength; and
   at least one register operable for receiving a data value, said selectable drive strength being selected in response to said data value, said data value being operable for setting in response to an amount of memory coupled to said memory bus, wherein said memory bus includes a control portion and a data portion, said at least one register including a first register operable for receiving a first data value operable for selecting a drive strength of drivers coupled to said control portion and a second register operable for receiving a second data value operable for selecting a drive strength of drivers coupled to said data portion.

2. The apparatus of claim 1 further comprising at least one load balancer coupled to said memory bus, said load balancer operable for loading a data portion of said memory bus with a load corresponding to a load represented by a portion of a memory device.

3. The apparatus of claim 2 wherein said load balancer is operable for switching onto said data portion of said memory bus in response to a number of memory slots containing a memory device.

4. The apparatus of claim 1 further comprising a memory device coupled to said memory bus, said memory device comprising a plurality of memory modules, wherein said data value is set in response to a number of memory modules included in said plurality of memory modules.

5. The apparatus of claim 4 wherein each of said memory modules includes a plurality of memory cells, and wherein said data value is set in further response to a number of memory cells in said plurality of cells.

6. The apparatus of claim 1 further comprising a predetermined plurality of resistors serially coupled between an output of each of said drivers in a plurality of memory bus signal lines included in said memory bus.

7. A data processing system comprising:
   A central processing unit (CPU);
   a memory device coupled to said CPU via a memory bus; and
   an apparatus for tuning said memory bus, said apparatus comprising:
      a plurality of drivers coupled to said memory bus, wherein each driver has a selectable drive strength; and
      at least one register operable for receiving a data value from said CPU, said selectable drive strength being selected in response to said data value, said data value being operable for setting in response to an amount of memory coupled to said memory bus, wherein said memory bus includes a control portion and a data portion, said at least one register including a first register operable for receiving a first data value operable for selecting a drive strength of drivers coupled to said control portion and a second register operable for receiving a second data value operable for selecting a drive strength of drivers coupled to said data portion.

8. The data processing system of claim 7 further comprising at least one load balancer coupled to said memory bus, said load balancer operable for loading said memory bus with a load corresponding to a load represented by a portion of a memory device.

9. The data processing system of claim 8 wherein said load balancer is operable for switching onto said memory bus in response to a number of memory slots containing a memory device.

10. The data processing system of claim 7 wherein said memory device includes a plurality of slots, each slot being operable for receiving a memory module, wherein said data value is said in response to a number of slots containing memory modules.

11. The data processing system of claim 10 wherein said CPU is operable for determining said number of slots containing memory modules, said CPU setting said data value in response thereto.

12. A method of memory bus tuning comprising the steps of:

determining an amount of memory in a memory device coupled to said memory bus;

setting a first data value in a first register in response to said amount of memory;

selecting a drive strength of a plurality of drivers operable for driving said memory bus in response to said first data value; and setting a second data value in a second register in response to said amount of memory, wherein said drive strength selected in response to said first data value corresponds to a drive strength of drivers coupled to a control portion of said memory bus, and wherein said drive strength of drivers coupled to a data portion of said memory bus is selected in response to said second data value.

13. The method of claim 12 further comprising the step of, if said amount of memory is less than a preselected amount of memory, loading a data portion of said memory bus with at least one load balancer.

14. The method of claim 12 wherein in said step of determining said amount memory comprises the step of:

sending an inquiry signal to said memory device by a central processing unit (CPU);

receiving a data signal from said memory device by said CPU, wherein said data signal includes a second data value corresponding to said amount of memory in said memory device.

15. The method of claim 14 wherein said first data value is set by said CPU.

16. A data processing system comprising:

a central processing unit (CPU);

a memory device, said memory device including a plurality of memory slots, each slot being operable for receiving a memory module having a plurality of memory cells; and a memory controller operable for coupling said CPU to a memory bus, said memory bus being coupled to said memory device, wherein said memory controller includes a plurality of drivers coupled to a portion of said memory bus operable for driving said memory device, each driver having a plurality of selectable drive levels, and said memory controller having a register operable for receiving a data value from said CPU, wherein one of said plurality of drive levels is selected in response to said data value, and wherein said CPU is operable for determining a number of memory slots having a memory module included therein, said data value being set in response to said number of slots, wherein said portion of said memory bus comprises a control portion of said memory bus, said data processing system further comprising at least one load balancer coupled to said data portion of said memory bus one said number of memory slots having a memory module is less than a preselected number of memory modules.

17. The data processing system of claim 16 wherein said at least one load balancer is operable for switching onto said data portion of said memory bus in response to a data value in a load register.

18. The data processing system of claim 17 wherein said data value in said control register is set in response to said number of memory slots having a memory module.

\* \* \* \* \*

UNITED STATES PATENT AND TRADEMARK OFFICE
CERTIFICATE OF CORRECTION

PATENT NO. : 6,496,911 B1 Page 1 of 1
DATED : December 17, 2002
INVENTOR(S) : Robert Christopher Dixon, Thoi Nguyen and Tuan Hoang Nguyen It is certified that error appears in the above-identified patent and that said Letters Patent is hereby corrected as shown below:

Column 8,
Line 40, please replace "control" with -- load --.

Signed and Sealed this

Twelfth Day of August, 2003

JAMES E. ROGAN
*Director of the United States Patent and Trademark Office*